E. R. BROWN.
BELT GUIDE.
APPLICATION FILED JAN. 15, 1917.
1,240,537.
Patented Sept. 18, 1917.
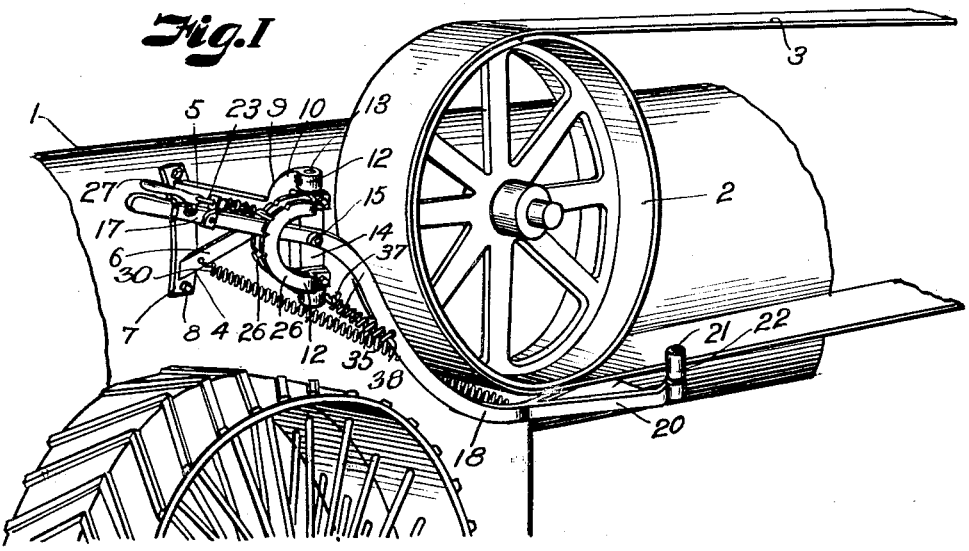
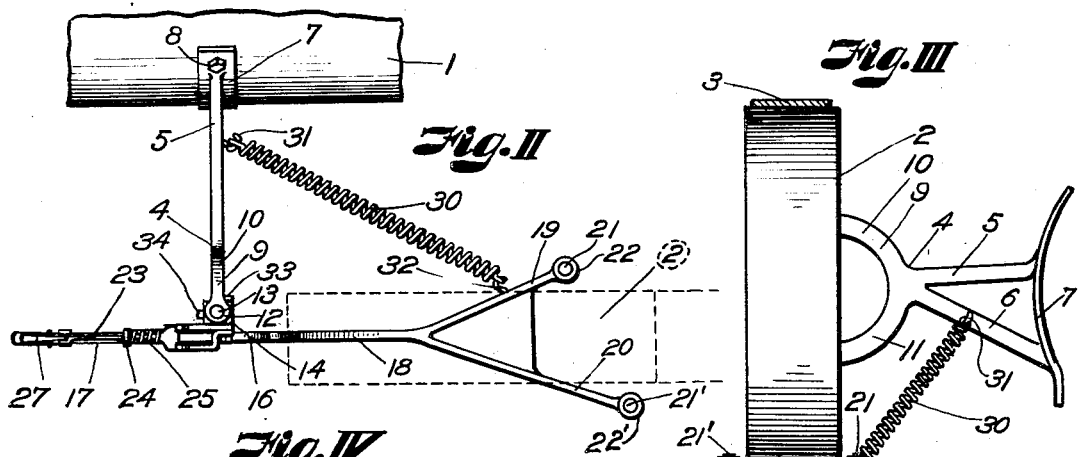
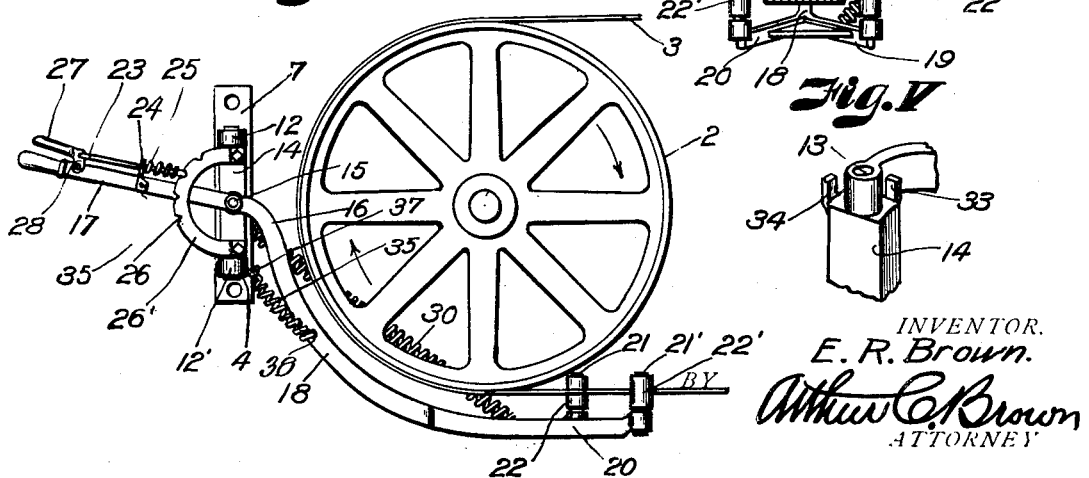
INVENTOR.
E. R. Brown.
BY
Arthur C. Brown
ATTORNEY

UNITED STATES PATENT OFFICE.

EDWARD R. BROWN, OF ROCKY FORD, COLORADO.

BELT-GUIDE.

1,240,537.

Specification of Letters Patent.   Patented Sept. 18, 1917.

Application filed January 15, 1917.  Serial No. 142,395.

*To all whom it may concern:*

Be it known that I, EDWARD R. BROWN, a citizen of the United States, residing at Rocky Ford, in the county of Rooks and State of Colo., have invented certain new and useful Improvements in Belt-Guides; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to belt guides and more particularly to a device of this character, for retaining a driven belt in operative alinement on the drive or fly wheel of a traction engine.

To traction engineers and particularly to persons familiar with the threshing of grain it is known, that unless the engine fly wheel and the belt wheel on the separator are brought in perfect alinement when a setting is made, the belt carried thereon will creep from the drive wheel and that time is lost in replacing the belt and bringing the machines in such alinement that the belt will operate successfully.

It is also known that side winds blowing against the belt or the unlevel setting of the engine also has a tendency to throw the belt from alinement and should the belt run from the drive wheel it is apt to be more or less damaged by contact with the driving gears of the fly wheel or it may cause injury to the machine or persons standing near.

It is, therefore, the object of the present invention to provide simple and effective means whereby a driven belt of this character may be held in proper operative alinement on the fly wheel of traction or like engines regardless of any slight mis-alinement of the machines or the blowing of side winds transversely across the belt.

A further object of the invention is to provide means whereby the guide members may be moved to throw the belt from the drive wheel or may be further utilized to assist in placing the belt on the wheel after the machines are brought into operative alinement.

In accomplishing these objects I have provided improved details of structure, the preferred forms of which are illustrated in the accompanying drawings, wherein:—

Figure I is a perspective view of a portion of a traction engine, having a belt guide of the present invention mounted embodying thereon and illustrating its mounting relative to the fly wheel and belt.

Fig. II is a plan view particularly showing the relative positions of the belt and guide rollers.

Fig. III is a front view of the same parts.

Fig. IV is a side elevation of the guide parts and fly wheel.

Fig. V is a detail perspective view showing the arm supporting block and stop members thereon.

Referring more in detail to the drawings:—

1 designates an engine of the ordinary type having a fly wheel 2 over which a belt is adapted to travel.

Mounted on the engine body, preferably at a point slightly back of the fly wheel is an outwardly extending bracket 4 comprising arms 5 and 6 which are attached to or formed integrally at their inner ends with a base member 7 that may be curved to fit the body of the engine to which the device is applied and is adapted to receive bolts or rivets 8 for attaching the bracket to the engine body.

At the outer end of the bracket is a yoke 9, comprising upper and lower arms 10—11 having vertically alining bearings 12—12' at their ends adapted to receive a bolt or pin 13 which extends through a block 14 to pivotally mount the latter between the yoke arms.

Pivotally mounted on the block 14 by means of a bolt 15 is an arm 16 comprising a rearwardly extended handle portion 17 and a downwardly and forwardly directed arm 18 that is so curved that when supported in functional position it will closely underlie the periphery of the belt wheel and has a bifurcated end portion comprising laterally directed arms 19—20 which terminate at opposite sides of the belt 3 forwardly of the axial point of the wheel 2 and in slightly offset transverse relation with the belt for a purpose presently set forth.

Revolubly mounted on pins 21—21' that extend vertically from the ends of the arms 19—20 are guide rollers 22—22' which are adapted to engage the belt at its opposite longitudinal edges, should it start to creep from the fly wheel to retain it in operative position on the wheel.

When the arm 18 is not needed or when the belt is being started on the fly wheel, it may be moved downwardly on its pivotal mounting so as not to interfere with placing of the belt, but in order to hold the arm in proper position when it is being used I provide a locking device, comprising a pin 23 that is slidably mounted in a bearing 24 that is mounted on the rearwardly extended handle portion 17, which is urged forwardly by a spring 25 that is attached thereto and bears against the bearing 24 so that the forward end of the pin will seat within the notched surface 26 of a sector plate 26' that is attached to the block 14.

Means for releasing the locking pin from the notched sector comprises a grip lever 27 that is pivotally attached to the outer end of the handle 17 and held in spaced relation therewith by an offset portion 28; the locking pin 23 being pivotally connected with the lever in such a manner that when the grip member is pressed toward the lever 17 the pin will be drawn outwardly against the pressure of the spring to release the locking end from the sector notches so that the arm may be moved vertically on its mounting to raise or lower the guide arm.

To normally urge and yieldingly retain the guide arm in functional position I provide a tensioning spring 30 which is attached at one end to a hook 31 on the bracket arm 6 and at its opposite end to a hook 32 on the arm 19. The inward swing of the guide is limited at a line parallel with the direction of the belt and its outward movement at a line practically perpendicular to the belt line; the travel of the arm being stopped at these limits respectively by stop members 33 and 34 mounted on adjacent faces of the block 14 which extend upwardly therefrom to contact opposite faces of the yoke arm 10.

I also attach one end of a tensioning spring 35 to a hook 37 on the lower yoke bearing 12, and its opposite end within an aperture 38 in the arm 18 to draw downwardly on the arm so that when it is released it will be automatically moved by the spring from functional position.

As before stated the guide rollers 22—22' are in offset relation relative to a transverse line across the belt, the reason of this being that should the rollers be directly opposite each other and in close relation to the longitudinal edges of the belt on swinging the arm 18 outwardly the belt would bind between the rollers, however, by arranging the rollers in the offset relation binding is prevented without effecting the guiding of the belt.

Assuming that the parts are so constructed and mounted on an engine, when the operator wishes to place the belt on the fly wheel of the engine, after the engine has been brought in proper alinement and spacing distance from the driven machine, the belt 3 is started on the edge of the fly wheel 2. The arm 16 is then swung outwardly on its supporting block 14 and the guide portion 18 raised to bring the rollers 22—22' into functional position at opposite sides of the belt. The engine is then started to revolve the fly wheel and as the spring 30 draws continuously on the arm 18 the outer roller is urged against the outer edge of the belt to push the belt farther onto the fly wheel.

When the arm 18 reaches a line parallel with the direction of the belt the stop member 33 engages a face of the yoke arm 10 to limit a further movement and the arm is yieldingly held in this position by the spring 30; the latter being of such strength that under normal conditions the belt is held on the wheel, no matter if the engine should be slightly out of alinement or level or the belt swayed laterally by cross winds.

If it is desired to remove the belt from the fly wheel the operator draws inwardly on the handle 17 to throw the arm 18 outwardly against the tension of the spring 30 and by the engagement of the roller 22 against the inner edge of the belt the latter is moved outwardly and the belt gradually pushed from the wheel.

By providing the notched sector it will be seen that the arm 18 may be locked at an elevation to engage the belt or when not necessary may be moved downwardly and locked in a position as to not interfere therewith.

With a device of this character it will be seen that a belt may be drawn to position and held in alinement on the drive wheel and may also be moved to easily and quickly throw the belt from the wheel, thereby eliminating the danger to workmen accompanying the usual method of removing and placing such belts.

Having thus described my invention what I claim as new therein and desire to secure by Letters-Patent, is:

1. A belt guide comprising a bracket having an end yoke, a block pivotally mounted in said yoke, a guide arm pivotally mounted on said block having a free end adapted to swing into and out of alinement with the line of a belt wheel and toward and from a belt carried by said wheel, rollers carried by the free end of the guide arm for engaging opposite edges of the belt, and means for yieldingly retaining said arm in alinement with the line of the belt wheel.

2. A belt guide comprising a bracket having an end yoke, a block pivotally mounted in said yoke, a guide arm pivotally mounted on said block having a free end adapted to swing into and out of alinement with the line of a belt wheel and toward and from a belt carried by said wheel, rollers carried by the free end of the guide arm for engaging opposite edges of the belt, means for yieldingly retaining said arm in alinement with the line of the belt wheel, and means for locking the free end of the guide arm in or out of functional position.

3. A belt guide comprising a bracket having an end yoke, a block having a vertical axial line pivotally mounted in said yoke, a guide arm pivotally mounted on the said block having a rearwardly extended lever arm and a forwardly extending bifurcated arm adapted to swing vertically toward and away from a belt, a sector plate mounted on the said block having a notched edge, a latch pin mounted on the lever arm adapted to seat in said sector notches to lock the outer end of the guide arm in a vertically adjusted position, rollers mounted at the end of the bifurcated arm adapted to engage opposite edges of the belt, and a tension spring attached to the bracket and to the forward end of the guide arm to yieldingly retain the latter in functional alinement.

4. A belt guide comprising a supporting bracket having an end yoke, a block having a vertical axial line revolubly mounted in said yoke, stop members on the block for limiting its revoluble movement, a guide arm pivotally mounted on the said block having a rearwardly extended lever arm and a forwardly extending bifurcated arm adapted to swing vertically toward and away from a belt, a sector plate mounted on the said block having a notched edge, a latch pin mounted on the lever arm adapted to seat in said sector notches to lock the outer end of the guide arm in a vertically adjusted position, rollers mounted at the end of the bifurcated arm in offset transverse relation to the belt and adapted to engage opposite edges thereof, a spring attached to the bracket and to the forward end of the guide arm to yieldingly retain the latter in functional alinement with the belt, and a spring attached to the lever arm and to a yoke member to urge the guide arm upwardly.

In testimony whereof I affix my signature.

EDWARD R. BROWN.

Witnesses:
G. STARBUCK,
W. H. BARTLETT.